US007948218B2

(12) United States Patent
Regazzi et al.

(10) Patent No.: US 7,948,218 B2
(45) Date of Patent: May 24, 2011

(54) VOLTAGE REGULATOR FOR MAGNETOGENERATORS WITH CONFIGURABLE CONNECTION OF THE PHASE WINDINGS

(75) Inventors: Gianni Regazzi, Argelato (IT); Pierluigi Calabri, San Lazzaro Di S. (IT); Alessandro De Angelis, Ascoli Piceno (IT)

(73) Assignee: Ducati Energia S.p.A., Bologna (IT)

( * ) Notice: Subject to any disclaimer, the term of this patent is extended or adjusted under 35 U.S.C. 154(b) by 431 days.

(21) Appl. No.: 12/168,931

(22) Filed: Jul. 8, 2008

(65) Prior Publication Data

US 2009/0021224 A1  Jan. 22, 2009

(30) Foreign Application Priority Data

Jul. 17, 2007  (IT) .............................. MI2007A1432

(51) Int. Cl.
*H02P 11/00* (2006.01)
*H02P 9/00* (2006.01)
*H02H 7/06* (2006.01)

(52) U.S. Cl. ............................. 322/28; 322/24; 322/90
(58) Field of Classification Search .................... 322/24, 322/28, 90
See application file for complete search history.

(56) References Cited

U.S. PATENT DOCUMENTS

| | | | | |
|---|---|---|---|---|
| 3,800,197 A * | 3/1974 | Mehta | ............................ | 318/93 |
| 3,984,750 A * | 10/1976 | Pfeffer et al. | .................. | 363/67 |
| 4,045,718 A * | 8/1977 | Gray | ............................ | 320/123 |
| 4,058,759 A * | 11/1977 | Halfhill | .......................... | 322/13 |
| 4,175,249 A * | 11/1979 | Gruber | .......................... | 323/271 |
| 4,236,050 A * | 11/1980 | Winslow et al. | ........... | 369/47.47 |
| 4,313,191 A * | 1/1982 | Winslow et al. | ........... | 369/275.3 |
| 4,338,557 A * | 7/1982 | Wanlass | ........................ | 318/729 |
| 4,339,704 A * | 7/1982 | McSparran et al. | ............ | 322/90 |
| 4,353,089 A * | 10/1982 | Winslow et al. | .............. | 386/203 |
| 4,374,323 A * | 2/1983 | Winslow et al. | ........... | 369/44.26 |
| 4,419,618 A * | 12/1983 | Gretsch | ........................... | 322/7 |
| 4,780,659 A * | 10/1988 | Bansal et al. | .................... | 322/58 |
| 4,884,018 A * | 11/1989 | Meuret et al. | ..................... | 322/8 |
| 5,276,603 A * | 1/1994 | Stanley | ........................... | 363/43 |
| 5,500,052 A * | 3/1996 | Horiuchi et al. | .............. | 136/244 |
| 5,625,276 A * | 4/1997 | Scott et al. | ..................... | 322/24 |
| 5,723,972 A * | 3/1998 | Bartol et al. | ..................... | 322/15 |
| 5,737,694 A * | 4/1998 | McMahill et al. | .............. | 455/76 |
| 5,859,525 A * | 1/1999 | Minks | ............................ | 322/94 |
| 6,049,198 A * | 4/2000 | Schenk | .......................... | 322/90 |
| 6,066,941 A * | 5/2000 | French | .......................... | 322/90 |
| 6,346,797 B1 * | 2/2002 | Perreault et al. | ................ | 322/29 |
| 6,366,060 B1 * | 4/2002 | Ely et al. | ......................... | 322/25 |
| 6,456,514 B1 * | 9/2002 | Perreault et al. | ................ | 363/89 |
| 6,671,195 B2 * | 12/2003 | Perreault et al. | ................ | 363/89 |
| 6,900,997 B2 * | 5/2005 | Perreault et al. | ............. | 363/127 |
| 6,912,142 B2 * | 6/2005 | Keim et al. | .................... | 363/89 |
| 6,914,342 B1 * | 7/2005 | French | ......................... | 290/40 R |
| 7,026,794 B1 | 4/2006 | French et al. | .................. | 322/90 |

(Continued)

*Primary Examiner* — T. C. Patel
*Assistant Examiner* — Pedro J Cuevas
(74) *Attorney, Agent, or Firm* — Young & Thompson (57) ABSTRACT

The voltage regulator receives power in A.C. from a permanent magnet voltage generator, having phase windings with a configurable connection, to supply power in D.C. to a battery. The voltage regulator comprises a plurality of semi-bridge rectifiers connected between the terminals of the phase windings of the voltage generator, and a battery power supply terminal; it also comprises a control circuit designed to change over the connection of the phase windings between two different configurations, for example star and delta, in relation to the charging voltage of the battery upon exceeding a threshold value of the phase frequency of the voltage generator.

8 Claims, 4 Drawing Sheets

U.S. PATENT DOCUMENTS

| | | | |
|---|---|---|---|
| 7,053,590 B2 * | 5/2006 | Wang | 322/24 |
| 7,078,881 B2 * | 7/2006 | Aoyama | 322/28 |
| 7,116,080 B2 * | 10/2006 | Chen | 322/24 |
| 7,227,340 B2 * | 6/2007 | Chen | 322/24 |
| 7,329,966 B2 * | 2/2008 | Konishi | 307/10.1 |
| 7,348,764 B2 * | 3/2008 | Stewart et al. | 322/24 |
| 7,528,584 B2 * | 5/2009 | Regazzi et al. | 322/28 |
| 7,626,835 B2 * | 12/2009 | Choi et al. | 363/34 |
| 7,772,808 B2 * | 8/2010 | Chen et al. | 322/28 |
| 2002/0089866 A1 * | 7/2002 | Keim et al. | 363/89 |
| 2002/0176266 A1 * | 11/2002 | Perreault et al. | 363/53 |
| 2005/0046395 A1 * | 3/2005 | Aoyama | 322/27 |
| 2005/0258892 A1 * | 11/2005 | Regazzi et al. | 327/540 |
| 2005/0269880 A1 * | 12/2005 | Konishi | 307/10.7 |
| 2006/0284605 A1 * | 12/2006 | Chen | 322/24 |
| 2008/0116759 A1 * | 5/2008 | Lin | 310/184 |
| 2010/0071970 A1 * | 3/2010 | Welchko et al. | 180/65.1 |
| 2010/0072928 A1 * | 3/2010 | Welchko | 318/400.13 |

\* cited by examiner

VOLTAGE REGULATOR FOR MAGNETOGENERATORS WITH CONFIGURABLE CONNECTION OF THE PHASE WINDINGS

BACKGROUND OF THE INVENTION

This invention refers to a voltage regulator for magnetogenerators of the type having a variable winding configuration, normally used in charging batteries for powering electrical loads, for which a sufficient quantity of energy is required both at low and high number of revolutions of the magnetogenerator, to maintain the voltage of the battery at a constant rated value, regardless of the power required by the electrical load to which the battery is connected.

STATE OF THE ART

In numerous applications of voltage magnetogenerators, designed to operate both at low and high number of revolutions, for example to supply electrical power to an ignition circuit, and/or to a battery for powering small internal combustion engines, outboard engines for small watercraft, or in other uses for which different current values at different rotational speeds are required, it is possible to satisfy such requirements by intervening on the electrical and mechanical dimensions of the generator itself. Usually, this is made possible for voltage magnetogenerators of large dimensions, however it requires the availability of space and in any case generators of considerable weight and relatively high cost. Moreover, in relation to the contemplated application and the operative conditions of the generator, in certain cases problems may arise in dissipating any excess of power.

Wherever, due to reasons of space, cost, or for other reasons it is not possible make use of voltage generators of larger dimensions, it is necessary to choose appropriate electrical solutions in order to satisfy the various requirements of use, and maintain the overall dimensions and weight of the generator comparatively limited.

It is also known that in order to charge the power of a voltage magnetogenerator, usually it is necessary to change the number of turns of the field windings, increasing or decreasing the winding turns according to whether one intends to privilege, in terms of output current, and performances at low or high operative speeds. For such purpose, in the past use was made of magnetogenerators provided with a plurality of windings capable of supplying a high output power, while maintaining weights and overall dimensions comparatively limited.

According to the previously proposed solutions, use was made of voltage generators whose field windings are operatively connected to a control circuit comprising a plurality of diodes and electronic switches controlled by a microprocessor. The microprocessor is programmed to change the configuration or connection of the phase windings upon variation of the rotational speed, between a "series configuration" at a low number of revolutions, and a "parallel configuration" at a higher number of revolutions; a solution of this kind is described for example in U.S. Pat. No. 7,026,794.

While on the one hand this solution contributes to solve part of the aforementioned problems, on the other hand it continues to present limits and drawbacks, such as low efficiency for single-phase alternators, and torque regularity problems, especially at low revolutions, known by the term "Cogging" as a result of an interaction between the magnets of the rotor and the magnetic structure of the stator. Moreover, the use of a voltage regulator controlled by a processor, besides requiring additional space, necessarily involves higher costs for the entire system.

There is consequently a need to find a new solution capable of meeting the aforementioned requirements, by reducing if not eliminating the problems and drawbacks inherent in these known systems.

OBJECTS OF THE INVENTION

A first object of the invention is to provide a voltage regulator for magnetogenerators of the type having a configurable connection of the field windings, which makes use of considerably simplified electronics, and offers the possibility of eliminating the use of processors or logic control units, thereby reducing the overall dimensions, maintaining comparatively low costs for the voltage regulator and for the entire voltage generating system.

A still further object of the invention is to provide the assembly of a voltage magnetogenerator and a voltage regulator for charging a battery, whereby it is possible to supply the battery with the necessary electric power, both at low and high number of revolutions of the generator, characterised by a low variation of the torque, and capable of automatically controlling the connection configurations of the field windings, both upon the variation of the charging voltage of the battery, and upon the variation of the number of revolutions of the voltage generator, or of its phase frequency.

A still further object is to provide a magnetogenerator and voltage regulator assembly capable of automatically changing the configuration of the connection of the field windings, thereby making the problems related to the heat dissipation, less critical.

BRIEF DESCRIPTION OF THE INVENTION

In general, according to a first aspect of the invention, a voltage regulator suitable to receive A.C. power from a voltage magnetogenerator, and to supply D.C. power to a battery has been provided, in which the voltage generator comprises a plurality of phase windings each having first and second connecting terminals, and in which the voltage regulator is conformed to change the connection of the phase windings between a first and a second configuration, in relation to the charging voltage for the battery, and/or the frequency of the same voltage generator;

characterised by comprising:

a plurality of pairs of semi-bridge rectifiers, in which each pair comprises first and second semi-bridges connected in phase opposition each other between a corresponding terminal of a respective phase winding of the magnetogenerator, and a power supply terminal for the battery;

a control switch circuit for varying the connection configurations of the phase windings, the control circuit comprising a plurality of switching devices each consisting of first and second electronic switches connected in anti-parallel, in a looped circuit in which the connection between two adjacent switching devices in turn is connected to a terminal of a respective phase winding; and a pilot circuit for controlling the switching devices of the control circuit, the pilot circuit comprising a first transistor connected to control electrodes of the switching devices; and in which the first transistor is operatively connected to a first voltage detecting circuit for measuring the voltage of the battery, respectively to a second phase-frequency detecting circuit of a winding of the voltage generator;

the frequency detecting circuit being conformed and operatively connected to activate the pilot circuit to selectively change the connection configuration of the field windings of the magnetogenerator, in relation to a pre-established threshold value of the phase frequency and/or battery voltage detected by said detecting circuits.

BRIEF DESCRIPTION OF THE DRAWINGS

These and further features of the voltage regulator according to the invention, and a preferential embodiment thereof will be more clearly evident from the following description with reference to the drawings, in which.

DETAILED DESCRIPTION OF THE INVENTION

Figure 1:
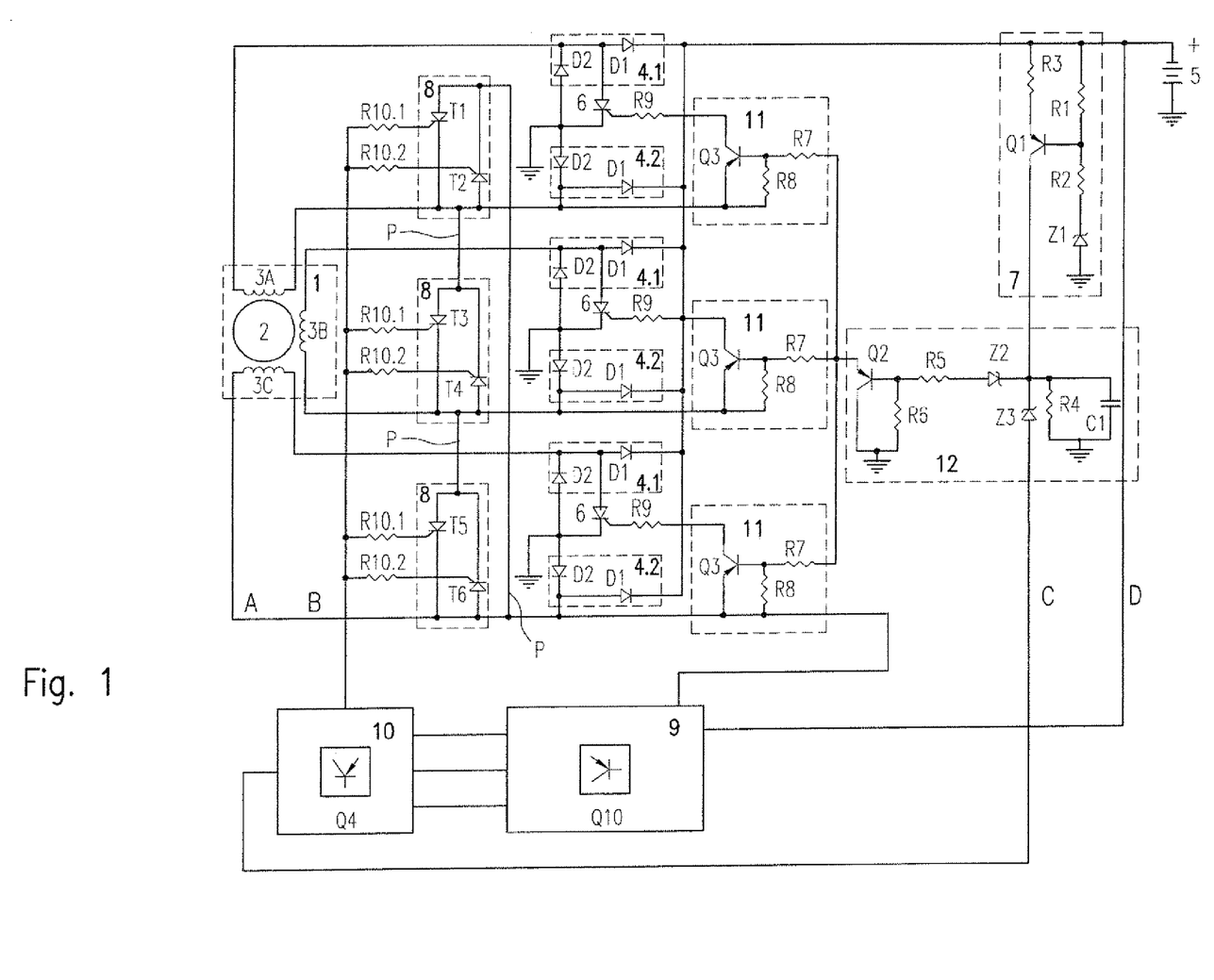
FIG. 1 shows a diagram of the electronic circuit of the voltage regulator.
Figure 2:
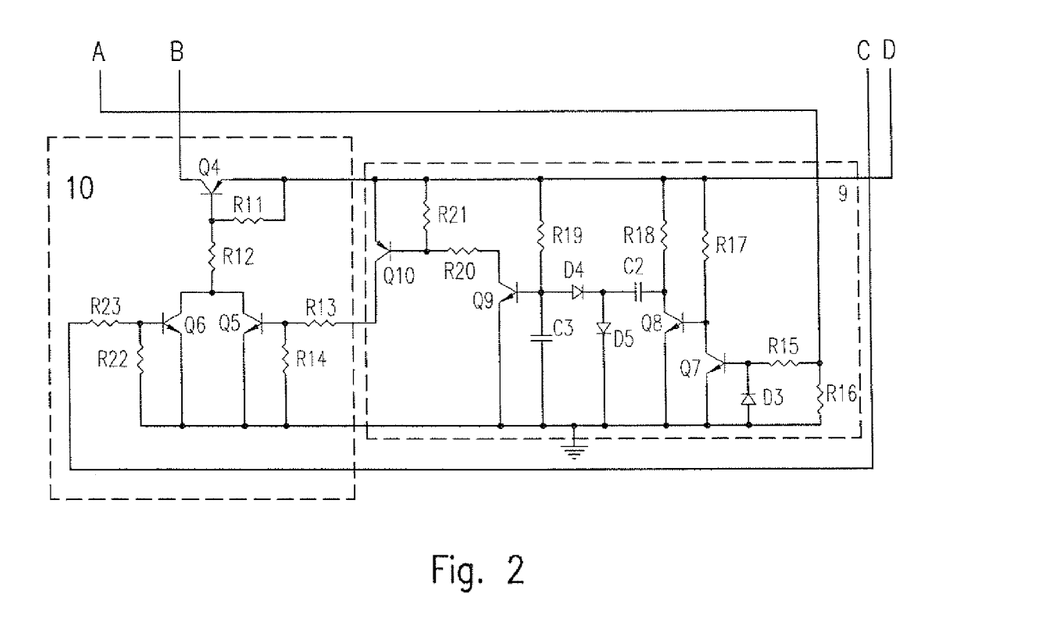
FIG. 2 shows the detailed electronic diagram of the phase-frequency detecting circuit and of a pilot circuit for controlling a switching circuit for changing the connection configurations of the phase windings.

FIGS. 1 and 2 represent the diagram of an electronic voltage regulator according to the invention, by means of which it is possible to automatically control different connection configurations of the phase windings of a voltage magnetogenerator, for converting an A.C. into a D.C. power supplied to a battery, while maintaining the voltage of the same battery to a substantially constant rated value upon variation of the number of revolutions of the generator.

For the purposes of this description, it is pointed out that the same reference numbers have been used for identical blocks.

In the example of FIGS. 1 and 2, the voltage regulator is connected to an A.C. voltage magnetogenerator 1, for example consisting of a three-phase alternator of the permanent magnets type. The voltage generator 1 comprises a rotor 2 and a stator having three phase windings, 3A, 3B and 3C, whose connection can be changed automatically, between a star and a delta configuration, in relation to the number of revolutions of the rotor 2 and the charging voltage VB of a battery 5 powered by the magnetogenerator 1.

The voltage regulator comprises a plurality of pairs of semi-bridge rectifiers 4 each having diodes D1, D2 connected between a terminal of a respective phase winding 3A, 3B, 3C of the voltage generator 1, the ground, and a first power supply terminal of the battery 5, for example the positive terminal, as shown. In particular, the terminals of each of each phase winding 3A, 3B, 3C are connected to the positive terminal of the battery 5 by a pair of semi-bridge rectifiers provided by a first and a second semi-bridge rectifier 4.1 and 4.2, in phase opposition with one another, to alternately conduct during the positive and the negative half waves of the phase voltage.

One of the two terminals of each phase winding 3A, 3B and 3C, hereinafter also referred to as first terminal, in turn is connectable to earth by an electronic short-circuiting switch consisting, for example, of a thyristor 6, for controlling the rated charging voltage of the battery 5 as explained further on.

The voltage regulator 1 also comprises a control switch circuit for changing the connection configurations of the phase windings 3A, 3B, 3C of the voltage generator; in the case of the three-phase generator of FIG. 1, the control circuit for the winding configurations comprises three switching devices 8, each provided by two electronic switches connected in anti-parallel, for example consisting of a pairs of thyristors T1 and T2, T3 and T4, T5 and T6; the switching devices 8 in each circuit are connected each another according to a looped configuration, in such a way that the connection P common to two adjacent switching devices 8 is in turn connected to the second terminal of a respective phase winding 3A, 3B and 3C of the voltage generator 1.

The voltage regulator comprises also a phase frequency detecting circuit 9 for detecting a phase voltage frequency of the generator, and a pilot circuit 10 for controlling the switching devices 8, shown in detail in FIG. 2. The frequency detecting circuit 9 is connected to a phase winding of the voltage generator 1, for example the winding 3C, and to the pilot circuit 10 which is activated by the circuit 9 for detecting the voltage frequency upon passing a pre-established threshold value of the same frequency to change the connection of the windings 3A, 3B and 3C between a star configuration and a delta configuration, as will be explained further on.

From the foregoing, it will be clear that the second terminal of each phase winding 3A, 3B and 3C, the terminal not connected to the short-circuiting switches 6, is connected to two switching devices 8 for changing the configurations of the windings; this means that the anodes of T1, T3 and T5 are connected respectively with the cathodes of T2, T4 and T6, just as the anodes of T2, T4 and T6 are connected with the cathodes of T1, T3 and T5. The three pairs of electronic switching devices 8 are consequently arranged in such a way that a single pair of switches 8 is connected in anti-parallel between the second terminals of two different phase windings.

From FIGS. 1 and 2 it can also be seen that the two thyristors T1 and T2 T3 and T4, T5 and T6 of each switching device 8, by means of a respective resistor R10.1 and R10.2, have their control electrode piloted in current by a single PNP transistor Q4 of the pilot circuit 10; depending on the voltage difference between anode and cathode imposed by the voltage generator 1, each of the thyristors T1-T6 is switched ON, determining the star connection of the three phase windings 3A, 3B and 3C.

The two thyristors T1, T2; T3, T4 and T5, T6 belonging to a same switching device 8, never conduct simultaneously, but do so alternately.

Figure 6:
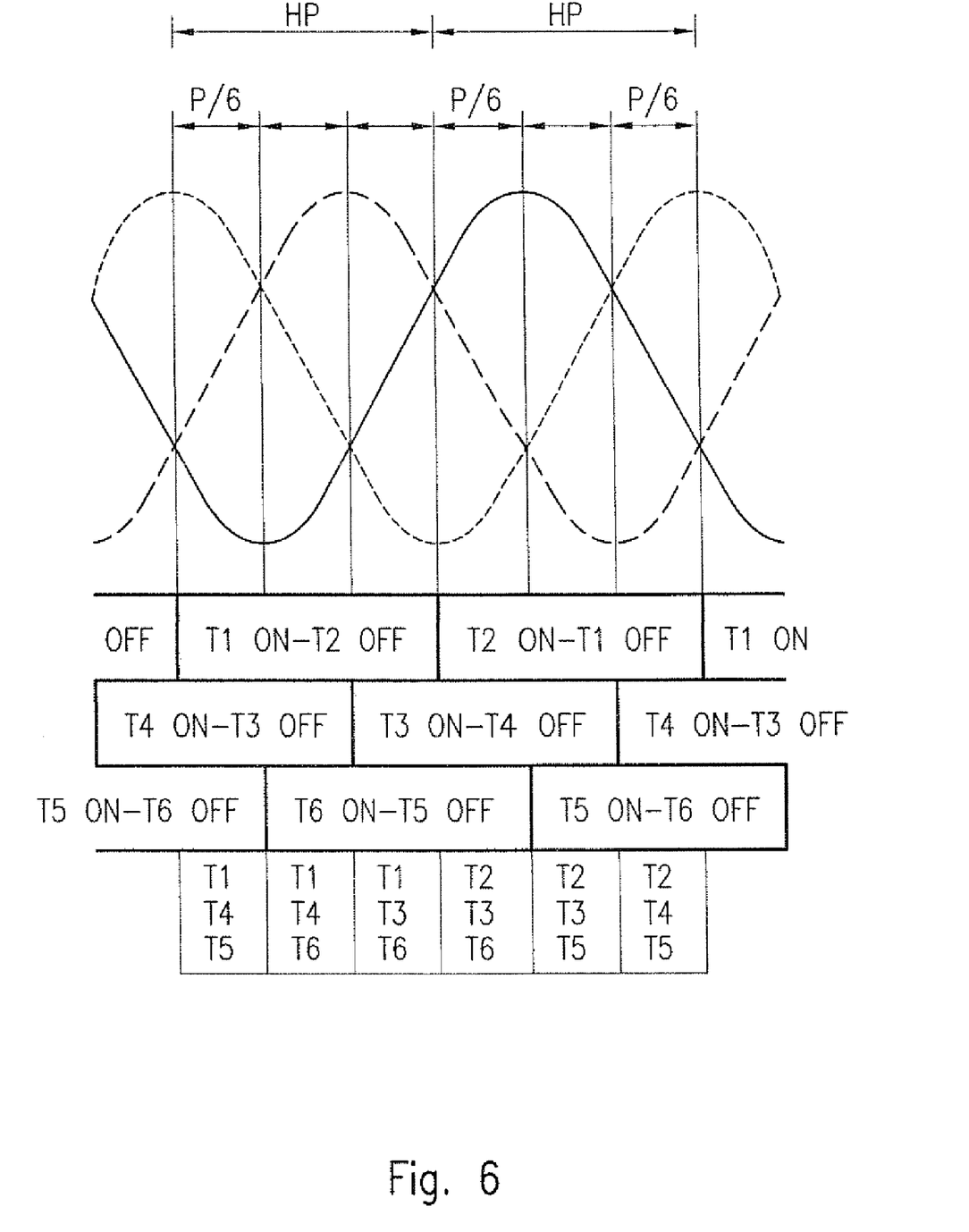
FIG. 6 is a graph showing the ON-OFF procedures for the electronic switches of the circuit for changing the configuration connection the phase windings.

In particular, as shown in FIG. 6 and as explained further on, when Q4 conducts, each electronic switch consisting of the thyristors T1-T6 of the circuit for changing the winding configurations, remains switched ON for half the cycle of the phase voltage, while a single pair of switches changes its state each sixth of a cycle.

If, conversely, Q4 is in a deactivated condition, the switches T1-T6 of the switching devices 8 are no longer piloted and switch OFF; consequently the three phase windings 3A, 3B, 3C are separated from one another. However, since the half-bridges 4.1, 4.2 are always connected to ground, like the battery 5, this condition is equivalent to a delta connection of the phase windings of the magnetogenerator 1.

The transistor Q4 of the pilot circuit 10, by means of a voltage divider R11, R12, is controlled by two NPN transistors Q5 and Q6, each having the collector and emitter terminals connected respectively between the base of Q4 and the ground of the voltage regulator. If one of the two transistors Q5 and Q6 conducts, then Q4 is switched ON; otherwise if both the transistors Q5 and Q6 are switched OFF, Q4 will also be switched OFF.

The transistor Q5 of the pilot circuit 10, has the bare connected to the voltage divider R13, R14, in turn piloted by the circuit 9 for detecting the voltage frequency of one of the phases of the voltage generator; the other transistor Q6 on the contrary is piloted by the circuit 9 through the voltage divider R22, R23, connected to a circuit 7 for detecting and measuring the charging voltage of the battery 5.

The circuit 9 receives at the inlet side the frequency of any one of the phases of the voltage generator 1, for example the phase of the winding 3C which, by the voltage divider R15, R16 (FIG. 2) causes the switching, at the same phase frequency, of the NPN transistor Q7 which during the negative half-waves is protected by the diode D3.

It likewise also switches the NPN transistor Q8, whose base is connected between the resistor R17 and the collector of Q7, restoring the correct timing of the signal.

Consequently, the current which flows from the resistor R18 towards the capacitor C2, is short-circuited to ground by Q8 with a frequency equivalent to that of the phase 3C of the voltage generator, thereby producing on the collector of Q8 a square voltage wave which, through the capacitor C2 enables the diodes D4 and D5 to discharge the capacitor C3 powered through R19 by the battery voltage.

As long as the resistor 19 maintains the voltage on C3 higher than the voltage Vbe-on between base and emitter of the NPN transistor Q9, then the latter is conductive and, with the voltage divider R20, R21 connected to the base of Q10 switches ON the latter, which in turn brings Q5 into conduction.

The result of all this is that the circuit 9 can enable or disenable the conduction of Q5 at a given threshold value of the phase frequency of the voltage generator, upon exceeding which the switching from star to delta connection, or vice versa, between the phase windings 3A, 3B and 3C will take place.

The frequency threshold at which Q5 goes into conduction or interdiction is obtained by selecting R19 in such a way that at the terminals of the capacitor C3 there is a voltage lower than the Vbe-on of Q9.

Conversely, as previously mentioned, the NPN transistor Q6 through the resistors R22 and R23 and the Zener diode Z3 is piloted by the circuit 7 for measuring the charging voltage of the battery 5. The voltage measuring circuit 7 comprises a PNP transistor Q1 whose collector and emitter are connected respectively to the battery 5 by the resistor R3, and to the Zener Z3; the base of Q1 is also biased by a voltage divider R1, R2 connected to ground by a Zener Z1.

When the voltage existing on the parallel circuit consisting of the capacitor C1 and the resistor R4 branched from the measuring circuit 7 for the voltage of the battery 5, exceeds the voltage value imposed by the Zener Z3, the current flows over the voltage divider R22, R23 and consequently Q6 goes into conduction, switching ON Q4.

As mentioned previously, one of the two terminals of each phase winding 3A, 3B, 3C is connected to the anode of an electronic switch 6, for example a shunt thyristor with the cathode connected to the ground, which has the function of short-circuiting to ground the respective phase winding when the voltage of the battery 5 detected by the circuit 7 exceeds a pre-established rated value VN.

As soon as the battery 5 reaches the value VR, the current of the generator is short-circuited to. This is done by the short-circuiting switch 6 of each phase winding, whose control electrode is connected to the collector of a PNP transistor Q3 having the emitter connected to the respective phase winding, forming part of control circuits 11 for controlling the ON and OFF states of the winding short-circuiting electronic switches 6.

The base of Q3 is biased by a voltage divider R7, R8 connected to the collector/emitter circuit of an NPN transistor Q2, having the collector connected to ground, forming part of a main control circuit 12 for activating/deactivating the winding short-circuiting control circuits 11.

The base of Q2 is biased by a voltage divider R5, R6 connected, by the Zener Z2, to the circuit 7 for detecting and measuring the voltage of the battery 5.

From the foregoing, it will be evident therefore that as long as the voltage VB of the battery 5 is lower than the voltage value of the Zener Z1, current does not circulate on the voltage divider R1, R2 and therefore the transistor Q1 remains disenabled. If, on the contrary, the voltage VB of the battery exceeds a pre-established value VR, Q1 switches ON into conduction supplying, by the resistor R3, a collector current proportional to the battery voltage. The voltage on the parallel circuit R4, C4 will increase linearly until it exceeds the voltage of the Zener diode Z2. As soon as this occurs, the transistor Q2 becomes biased to conduct thanks to the voltage divider R5, R6; in this way the transistors Q3 of the individual circuits 11 also become biased by the respective resistors R7 and R8. Therefore, a current will flow on the resistor R9 capable of switching ON the respective short-circuiting switch 6 which will connect to ground the respective one of the three phase windings 3A, 3B and 3C of the voltage magnetogenerator 1. Consequently, it will result in a battery voltage VB restricted to a value never exceeding the rated value VR.

When the number of revolutions of the voltage generator is higher than a pre-established threshold value RPM', the phase windings 3A, 3B and 3C have a delta configuration; as soon as the battery 5 reaches the rated value, the current of the generator is switched to ground. As mentioned previously, this gives rise to a greater power dissipation to ground by the voltage generator 1 and by the short-circuiting switches 6; therefore it is essential to reduce this current to a minimum. For this purpose it is advisable to choose the voltage value of Z3 slightly lower than that of Z2, typically 0.6 volt, so as to ensure the changing from delta to star configuration just before the regulation, which can thus occur with considerably reduced currents.

Figure 3:
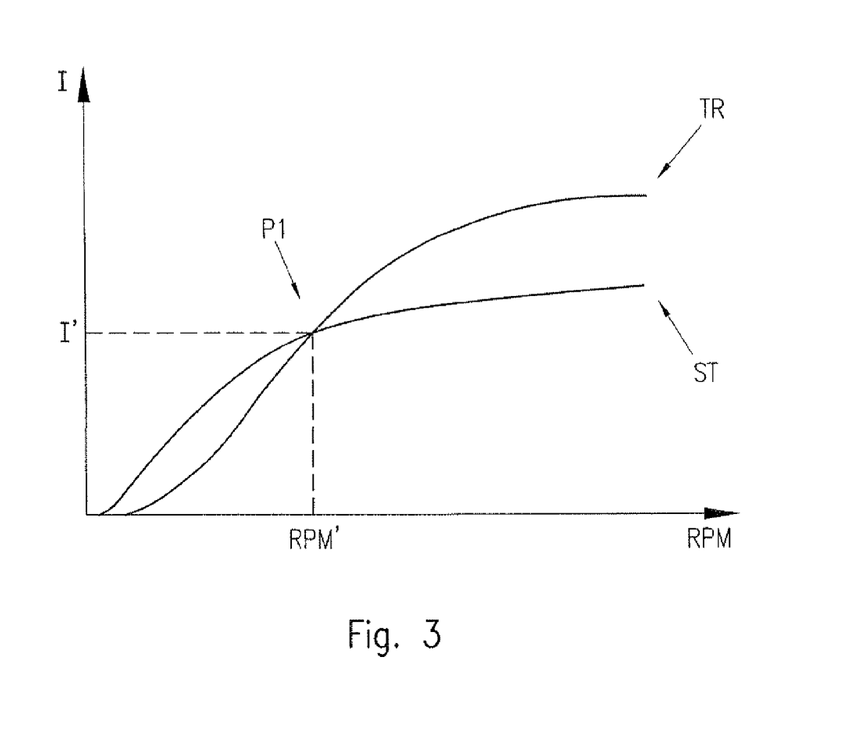
FIG. 3 shows a graph of the current of each half bridge rectifier, in relation to the number of revolutions of the voltage generator, for both star and delta connections of the phase windings.

FIG. 3 of the drawings shows two typical graph of the current I of the battery, both in the case of star connection, and in the case of delta connection upon variation of the number of revolutions per minute, RPM, of the rotor 2 of the voltage generator 1. In particular, the graph ST shows the flow of I in the case of a star connection, while the graph TR shows the flow of I in the case of a delta connection. It can be seen that the current I, at low revolution numbers, below the threshold value RPM', assumes lower values when the phase windings are delta connected TR, compared to the star connection ST; the opposite occurs at revolution numbers higher than RPM'.

FIG. 3 also shows the point P1 relating to a revolution number corresponding to the threshold value RPM', for which the voltage generator 1 supplies a current I' for powering the battery 5 quantitatively independent of the type of connection of phase windings; point P is consequently the time at which occurs the change between the delta and star connection, and vice versa.

Figure 4:
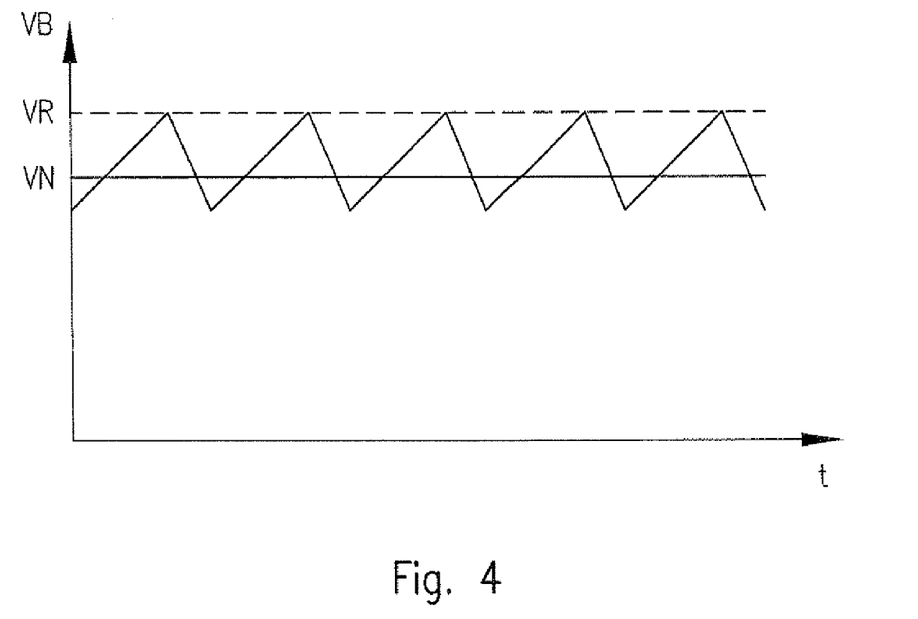
FIG. 4 shows a graph of the battery voltage, in relation to time, when the number of revolutions of the generator is below a threshold value of the voltage frequency.
Figure 5:
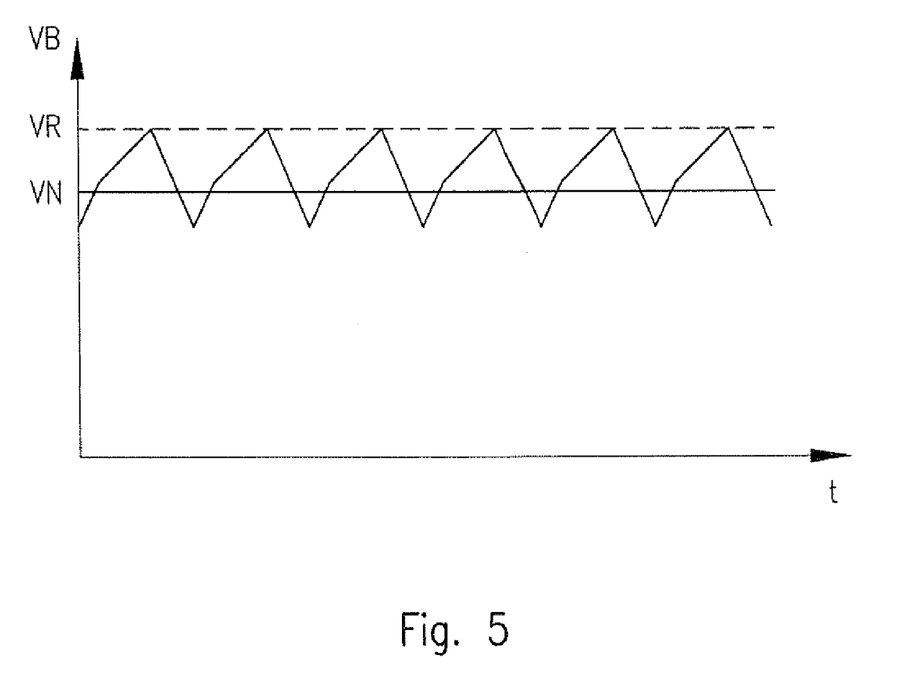
FIG. 5 shows a graph of the battery voltage, in relation to time, when the number of revolutions of the generator is above a threshold value of the voltage frequency.

FIG. 4 shows the graph in respect to time of the voltage VB of the battery 5 in the event of the number of revolutions RPM of the rotor 2 being lower than RPM' of FIG. 3, while FIG. 5 shows the graph over time t of the voltage VB in the event of the number of revolutions RPM being higher than RPM'.

In particular, from FIG. 4 it can be seen that the gradient of the curve, each time the nominal voltage VN is exceeded, is substantially constant up to the rated value VR; conversely, from FIG. 5 it can be seen that the gradient of the curve changes and decreases each time the rated voltage VN is exceeded.

Lastly, FIG. 6 shows the procedure with which the electronic switches T1-T6, which allow the selective star and delta connections of the phase windings 3A, 3B and 3C of the voltage generator 1, are piloted in conduction (ON), or in interdiction (OFF), by the voltage regulator.

In particular, from FIG. 6 it can be seen that for each half cycle HP of each of the three phases A, B and C of the voltage magnetogenerator 1, only one of the thyristors T1-T6 in each of the switching circuits 8 for changing the connection configuration, is conductive (ON); at the same time in the same FIG. 6 it can also be noted, still in the case of a three-phase generator, that each sixth of a cycle P/6 a single pair of thyristors T1-T6 changes state.

The method of operating of the voltage regulator of FIGS. 1 and 2 is briefly described hereunder.

In general, in the various possible applications of this invention it is required that at both low and at high rotational speeds of the magnetogenerator 1, a sufficient quantity of electric power, or current, is available for maintaining the battery 5 at a constant charging voltage VB, regardless of the current required by the electric loads connected to it.

As mentioned previously, a terminal of each of the three phase windings 3A, 3B and 3C of the generator 1 is connected to the positive terminal of the battery 5 by a pair of semi-bridge rectifiers 4.1, 4.2, and is selectively connectable to ground by a short-circuiting switch 6 controlled by the electronic control circuit 11.

In order to change the connection configuration of the phase windings, from star to delta and vice versa, as mentioned previously the voltage regulator comprises three switching devices 8 each consisting of a first and second thyristor T which have their respective anodes and cathodes connected in anti-parallel with one another, and connected to the terminals not short-circuitable to ground of two different phase windings; the control electrodes of the thyristors T of the three switching devices 8 are piloted separately by the electronic circuits 9 and 10 which carry out both the measurement of the voltage frequency of one phase of the generator 1, for example the Frequencies of the phase winding 3.6, and the changing of the connection configuration.

Since there is a proportional relationship between the phase frequency and the number of revolutions per minute (RPM) of the rotor 2, according to which the number of revolutions per minute is equivalent to the ratio between the electric frequency and the number of polar couples of the rotor (constant), a measurement of the phase frequency will result corresponding to the measurement of the number of revolutions RPM of the magnetogenerator 1.

As pointed out previously with reference to FIG. 3, it is also known that at low numbers of revolutions of the voltage magnetogenerator, the current I supplied to the battery 5 is greater if the phase windings are star connected, compared to a delta connection; the opposite occurs for a high number of revolutions.

Consequently, as soon as the rotor 2 begins to move the electronic measuring circuit 9 and the control circuit 10 bring the three switching devices 8 into conduction, giving rise to the star connection of the phase windings 3A, 3B and 3C. This operative procedure is maintained until the generator 1 reaches a number of revolutions of a pre-established value, referred to as threshold value RPM', corresponding to the point P of FIG. 3 in which the value of the current I' supplied by the generator is unrelated to the star or delta type connection of the phase windings.

Under these conditions the circuits 9, 10 for measuring the speed of rotation and controlling the switching devices 8, no longer pilot the thyristors T which switch OFF as soon as their current drops to zero; the phase windings thus turn out to be delta connected, and remain so upon the increase of the number of revolutions RPM to fulfill a greater request for electric power.

In both these modes of connection of the phase windings, however, the switches 6 for short-circuiting to ground the phase windings, are activated as soon as the battery rated value VR is exceeded; in addition, in order to decrease the current which flows in the phase windings of the generator, and in the switching devices 8, the short-circuiting switches 6 do not enter into conduction when the phase windings are delta connected, but only after the control circuit 10 has forced the star connection.

Consequently, also at high numbers of revolutions of the voltage generator, close to the rated value VR of the battery voltage, it is advisable to reduce the current for short-circuiting to ground, returning to the star connection, and activating the short-circuiting switches 6 immediately after.

From what has been described and shown in the accompanying drawings, it will be clearly evident that a voltage regulator for permanent magnet generators is provided, with windings connection selectively configurable in two different conditions, of such kind as to supply the maximum current required to maintain the voltage VS for charging a battery constant, regardless of the requests for power thereby preventing, upon reaching the battery regulating voltage VR, excessive currents from flowing in the phase windings of the voltage generator 1 and in the switching devices 8 for changing the connection configuration.

It is understood that what has been described with reference to the various figures, has been given in order to illustrate the general characteristics of the invention, and of a preferential embodiment. Therefore, other modifications or variations may be made, for example for the application of a similar or equivalent voltage regulator to any multi-phase permanent magnet generator, without thereby departing from the claims.

What we claim is:

1. A voltage regulator suitable to change an A.C. power of a voltage magnetogenerator, into a D.C. power supplied to a battery, in which the voltage magnetogenerator comprises a rotor and a plurality of phase windings each having first and second connecting terminals, and in which the voltage regulator is conformed for changing the connection of the phase windings between a first and a second configuration in relation to a rated voltage of the battery and a voltage frequency of the magnetogenerator;

comprising:

first and second semi-bridge rectifiers connected, in phase opposition with one another, between a corresponding terminal of a respective phase winding of the magnetogenerator, and the battery;

a winding configuration control circuit for changing the connection of the phase windings, the winding configuration circuit comprising a plurality of switching devices, each consisting of first and second electronic switches connected in anti-parallel, in a looped circuit, in which the connection point between two adjacent switching devices is in turn connected to one terminal of a respective phase winding;

a pilot circuit for the winding configuration circuit, the pilot circuit being connected to control electrodes of said first and second electronic switches of the switching devices respectively being operatively connected to a voltage measuring circuit for the battery, and to a phase-frequency detecting circuit;

the phase frequency detecting circuit being conformed to activate the pilot circuit and to selectively change the connection configuration of the windings at a pre-established threshold value of the voltage frequency detected by said frequency detecting circuit.

2. The voltage regulator according to claim 1, comprising:

an electronic short-circuiting switch between each phase winding and ground of the voltage regulator;

short-circuiting control circuits each connected to a control electrode of a respective short-circuiting switch; and a main control circuit operatively connected between the short-circuiting control circuits and the voltage measuring circuit, for short-circuiting to ground the windings of the magnetogenerator upon exceeding a rated value of the battery voltage.

3. The voltage regulator according to claims 2, wherein the main control circuit and the pilot circuit, are connected to the voltage measuring circuit by a respective Zener diode.

4. The voltage regulator according to claim 3, wherein the Zener diode of the pilot circuit, has a voltage value lower than the voltage value of the Zener of the main control circuit.

5. The voltage regulator according to claim 1, suitable for a voltage magnetogenerator having first, second and third phase windings, wherein the switching devices are connected each other and to the phase windings to change between star and a delta configuration of the same phase windings.

6. The voltage regulator according to claim 1, wherein a first terminal of each phase winding is connected to ground by a respective short-circuiting switch, and in that the other terminal of each phase winding is connected to a connection point between the switching devices.

7. The voltage regulator according to claim 1, wherein the pilot circuit is operatively connected to a voltage-frequency detecting circuit of the magnetogenerator.

8. The voltage regulator according to claim 1, wherein each switching device consists of a first and second thyristors connected in anti-parallel.

* * * * *